(12) United States Patent
Gotsche et al.

(10) Patent No.: US 6,444,785 B1
(45) Date of Patent: Sep. 3, 2002

(54) PREPARATION OF W/O EMULSIONS

(75) Inventors: Michael Gotsche, Aachen; Claudia Wood, Weinheim; Kristin Tiefensee, Westheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/520,173

(22) Filed: Mar. 7, 2000

(30) Foreign Application Priority Data

Mar. 12, 1999 (DE) .......................................... 199 11 170

(51) Int. Cl.$^7$ .............................. C08F 2/32; C08F 6/16; C08J 3/24
(52) U.S. Cl. ......................... 528/485; 516/21; 516/28; 524/460; 524/801; 528/486
(58) Field of Search .................. 516/21, 28; 524/460, 524/801; 528/486, 485

(56) References Cited

U.S. PATENT DOCUMENTS

| | | | | |
|---|---|---|---|---|
| 4,102,807 A | * | 7/1978 | Iwama et al. | 516/28 X |
| 4,174,336 A | * | 11/1979 | Leiner et al. | 524/460 |
| 4,367,323 A | * | 1/1983 | Kitamura et al. | 524/460 X |
| 4,379,883 A | * | 4/1983 | Zecher | 524/801 |
| 4,524,175 A | * | 6/1985 | Stanley, Jr. | 524/801 X |
| 4,529,753 A | | 7/1985 | Taylor | 523/328 |
| 4,925,884 A | | 5/1990 | Hübner et al. | 523/340 |
| 5,087,676 A | | 2/1992 | Heider et al. | 526/93 |
| 5,216,070 A | * | 6/1993 | Plochocka et al. | 524/801 |
| 5,750,614 A | * | 5/1998 | Hund et al. | 524/460 |
| 5,886,140 A | * | 3/1999 | Olivares et al. | 528/486 X |
| 5,928,656 A | * | 7/1999 | Chaudhry et al. | 524/801 X |

FOREIGN PATENT DOCUMENTS

| | | |
|---|---|---|
| DE | 35 22 419 | 1/1987 |
| DE | 197 41 187 | 3/1999 |
| EP | 0 028 348 | 5/1981 |
| EP | 0 126 528 | 11/1984 |
| EP | 0 297 184 | 1/1989 |
| EP | 363 795 | 4/1990 |
| EP | 0 383 057 | 8/1990 |
| EP | 547 492 | 6/1993 |
| EP | 0 563 726 | 10/1993 |
| EP | 0 764 699 | 3/1997 |
| EP | 0 767 180 | 4/1997 |
| WO | WO 95/33775 | 12/1995 |
| WO | WO 99/14249 | 3/1999 |

* cited by examiner

Primary Examiner—Richard D. Lovering

(57) ABSTRACT

A process is provided for preparing W/O emulsions having crosslinked water-swollen polymers dispersed therein, by aftertreatment with a redox initiator system to reduce the residual monomer content.

20 Claims, No Drawings

PREPARATION OF W/O EMULSIONS

The invention relates to a process for preparing W/O emulsions comprising crosslinked water-swellable addition polymers dispersed therein, by aftertreatment with a specific redox initiator system to reduce the amount of residual monomers.

Crosslinked acrylic acid polymers are used as thickeners in textile printing and also in cosmetic and pharmaceutical formulations. These polymers can be prepared by free-radical polymerization or copolymerization in W/O emulsions. On incorporation into aqueous formulations, emulsions of this kind invert and cause thickening of the formulations.

EP 383 057 describes a crosslinked copolymer of acrylic acid and nitrile comonomers prepared in a water/paraffin emulsion. The emulsions described are used in textile printing.

DE 35 22 419 describes the inverted emulsion polymerization of acrylamide with acrylic acid in one process step.

A process for preparing water-soluble or water-swellable polymers in a W/O emulsion is claimed by EP 126 528, and comprises polymerizing the water-soluble monomers in the presence of emulsifiers with the addition of a specific dispersing system comprising alkanols.

Crosslinked acrylic acid polymers in a W/O emulsion are also described in EP 297 184 for use as water absorbents.

Following their preparation by free-radical polymerization or copolymerization, W/O emulsion polymers include an unwanted fraction of unpolymerized free monomers (residual monomers) in addition to a polymer solids fraction of from 15 to 50% by weight. The reason for this is the incomplete polymerization of the monomers employed in the free-radical main polymerization, which is normally conducted up to a monomer conversion of 95% and, preferably, from 98 to 99.8% by weight. For reasons primarily of toxicology, the market demands polymers combining a low residual monomer content with unimpaired processing and performance properties.

Methods of lowering residual monomers in aqueous polymer dispersions are well known. In addition to nonchemical methods, such as stripping with inert gas or steam, a wide variety of chemical methods is available, as described, for example, in EP-B 028 348, EP-B 563 726, EP-A 764 699, and US-A 4 529 753, to lower residual monomer contents in aqueous polymer dispersions.

In accordance with WO 95/33775, aqueous polymer dispersions can be aftertreated using redox systems whose reducing agent comprises an adduct of hydrogen sulfite anion and a ketone of 3 to 8 carbon atoms, and/or the conjugate acid of said adduct. The aftertreatment is performed in the presence of metal compounds which are soluble in the aqueous medium.

For the reduction of residual monomer contents, EP-A 767 180 recommends a redox initiator system comprising organic hydroperoxides which are soluble only very sparingly if at all in water, and, inter alia, adducts of bisulfites with aldehydes having a carbon chain of 4 to 6 carbon atoms.

The patent application DE 19840586 describes the use of oxidizing agents in combination with a redox system comprising an aldehyde for depleting residual monomers in aqueous polymer dispersions.

In accordance with DE 19741187, a system comprising an oxidizing agent and an organic α-hydroxy carboxylic acid is used for chemical removal of residual monomers.

All processes relate to the treatment of aqueous polymer dispersions. No process has to date been described for lowering residual monomers in W/O emulsions of W/O emulsion polymers comprising acrylic acid. Within these W/O emulsions, the polymers are located within isolated water droplets emulsified in the oil phase. This prevents the formation, as observable in a system with a continuous aqueous phase, of a gel phase which is difficult to process.

It is an object of the present invention to provide a novel, effective process for reducing the amount of residual monomers in W/O emulsions comprising crosslinked water-swellable polymers. In such a process the performance properties of the W/O emulsion, especially the thickener effect, should remain unaffected. Furthermore, the reduction in the amount of residual monomers should be easy to utilize industrially.

We have found that the subject is achieved and that the amount of residual monomers in W/O emulsions comprising crosslinked polymers swollen in water can be effectively reduced if the W/O emulsion comprising the residual monomers is aftertreated with the addition of a redox initiator system.

A preferred process comprises conducting the aftertreatment with a redox initiator system comprising essentially a) from 0.001 to 5% by weight, based on the total monomer amount used to prepare the polymer,
   a1) of an oxidizing agent:

$R^1OOH$, 

where $R^1$ is hydrogen, a $C_1$- to $C_8$-alkyl or $C_6$- to $C_{12}$ aryl group, and/or
   a2) of a compound which in aqueous medium releases hydrogen peroxide, and b) from 0.005 to 5% by weight, based on the total monomer amount used to prepare the polymer,
   b1) of an α-hydroxy carbonyl compound:

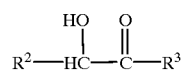

where, independently at each occurrence,
   $R^2$ is hydrogen or a $C_1$–$C_{12}$-alkyl group which if desired contains functional groups and/or can be olefinically unsaturated,
   $R^3$ is hydrogen, OH, a $C_1$–$C_{12}$-alkyl group which if desired contains functional groups and/or can be olefinically unsaturated,
   and $R^2$ and $R^3$ can form a ring structure which can include a heteroatom and/or functional groups and/or can be olefinically unsaturated, and/or
   b2) a compound which in aqueous medium releases such an α-hydroxy carbonyl compound, and c) catalytic amounts of a polyvalent metal ion which is able to exist in a plurality of valence states.

The oxidizing agent of the redox initiator system should be in a position to form free radicals. Oxidizing agents employed in the redox system are preferably hydrogen peroxide but also include inorganic compounds such as potassium peroxide, sodium peroxide, sodium perborate, and other precursors which in aqueous medium form hydrogen peroxide. It is also possible, for example, to employ ammonium, potassium or sodium persulfate, peroxodisulfuric acid and its salts, ammonium, potassium or sodium perphosphate or diperphosphate, potassium permanganate, and other salts of per acids. Also suitable in principle are organic hydroperoxides, such as tert-butyl hydroperoxide and cumene hydroperoxide. It is, however, also possible to employ mixtures of different oxidizing agents.

The amount of added oxidizing agent is usually within the range from 0.001 to 5, preferably from 0.002 to 3, with particular preference from 0.003 to 2, with very particular preference from 0.01 to 1 and, most preferably, from 0.02 to 0.8% by weight, based on the total monomer amount.

The reducing agent used in the redox initiator system can be any of the agents which are usually susceptible to use.

Particularly suitable reducing agents are aliphatic α-hydroxy carboxylic acids and also precursors which in aqueous solution release these α-hydroxy carboxylic acids. Examples that may be mentioned of α-hydroxy carboxylic acids are aliphatic hydroxy carboxylic acids of preferably 2 to 8 carbon atoms, such as glycolic acid (hydroxyacetic acid), glycoxylic acid hydrate (dihydroxyacetic acid), lactic acid (2-hydroxypropionic acid), glyceric acid (2,3-dihydroxypropionic acid), malic acid (2-hydroxysuccinic acid) or tartronic acid (2-hydroxymalonic acid). The use of tartaric acid is preferred.

Also suitable as reducing agents, however, are aliphatic α-hydroxy carbonyl compounds, such as aliphatic α-hydroxy aldehydes and/or aliphatic α-hydroxy ketones, their isomers, and/or functional group substituted and/or olefinically unsaturated compounds and mixtures thereof, and also precursors which in aqueous solution release these α-hydroxy carbonyl compounds. Examples that may be mentioned of α-hydroxy carbonyl compounds are glycol aldehyde and/or its dimer, 2,5-dihydroxy-1,4-dioxane, phenylglycol aldehyde, 2-hydroxy-3-phenylpropionaldehyde, glyceraldehyde and its higher homologous compounds, such as aldotetroses, aldopentoses and aldohexoses, and also α-hydroxyacetone, α,α'-dihydroxyacetone, 1-hydroxy-2-butanone, 1-hydroxy-2-pentanone, 1-hydroxy-2-hexanone, 2-hydroxy-2-methyl-3-butanone (acetoin), 4-hydroxyhept-2-en-5-one, 2-hydroxy-3-pentanone, 3-hydroxy-2-pentanone, 3-hydroxy-4-heptanone, 4-hydroxy-3-heptanone, 4-hydroxy-2,2-dimethyl-3-pentanone, 3-hydroxy-2,2-dimethyl-4-pentanone, 2-hydroxy-1-phenyl-1-propanone, 1-hydroxy-1-phenyl-2-propanone, 1-hydroxy-1-phenyl-2-butanone, 2-hydroxy-1-phenyl-1-butanone, 2-hydroxy-1,2-diphenylethanone (benzoin), 2-hydroxy-1-phenyl-1,4-pentanedione, 1-hydroxy-1-phenyl-2,4-pentanedione, and cyclic α-hydroxy ketones, such as 2-hydroxycyclohexanone and 2-hydroxycyclopentanone. Preference is given to the use of α-hydroxyacetone, α,α'-dihydroxyacetone, 1-hydroxy-2-butanone, 1-hydroxy-2-pentanone, glutaroin, adipoin and/or 2-hydroxy-2-methyl-3-butanone (acetoin), but particular preference to α-hydroxyacetone and/or α,α'-dihydroxyacetone.

The amount of added reducing agent is customarily within the range from 0.005 to 5, preferably from 0.01 to 3, with particular preference from 0.03 to 2, with very particular preference from 0.05 to 1 and, most preferably, from 0.02 to 0.8% by weight, based on the total monomer amount. Higher amounts of reducing agent, although possible, are not generally sensible from the economic standpoint.

The metal compounds advantageous for the aftertreatment are, customarily, completely soluble in the aqueous medium of the W/O emulsion and their metallic component, moreover, is capable of existing in a plurality of valence states. The dissolved metal ions have a catalytic effect and assist the electron transfer reactions between the actually active oxidizing and reducing agents. Suitable dissolved metal ions are principally iron, copper, manganese, vanadium, nickel, cobalt, titanium, cerium or chromium ions. It is of course also possible to use mixtures of different, mutually compatible metal atoms, such as the system $Fe^{2/3+}/VSO_4^{3+}$. Preferably, iron ions are used.

The dissolved metal ions are used in catalytic amounts, usually in the range from 1 to 1000, preferably from 5 to 500 and, with particular preference, from 10 to 100 ppm, based on the total monomer mass.

For the aftertreatment of the W/O emulsion polymer, which is heated at from about 30 to 130, preferably from 40 to 90 and, with particular preference, from 40 to 80° C., the components of the initiator system used in accordance with the invention are judiciously metered in gradually with stirring, preferably under atmospheric pressure or, alternatively, under a pressure of greater than or less than 1 bar (absolute), metered addition taking place simultaneously or in succession, in the latter case preferably with addition of the oxidizing agent first. A particularly favorable procedure is the simultaneous metered addition of oxidizing agent and reducing agent by way of two separate feed streams. In this case the initiator components, for example, can be added from above, from below, or through the side of the reactor. Preferably, however, the initiator system is metered in from below. Since the optimum duration of initiator metering is dependent on the monomer composition, on the size of the reaction mixture, and on the reactor geometry, it is judicious to determine said duration in preliminary experiments. Depending on the task at hand, the duration of addition of initiator can extend from a few seconds to several hours. It is particularly favorable for the metal compound, which is employed in catalytic amounts, to be added to the W/O emulsion polymer prior to the addition of the oxidizing and reducing agent. In order to ensure sufficient concentrations of metal ions during the aftertreatment, it is therefore particularly advantageous to add complexing agents, such as, for example, ethylene diamine tetraacetic acid, nitriloacetic acid and diethylenetriamine pentaacetic acid, and/or their respective sodium salts, and/or to use stable metal ion complexes, such as, for example, iron(III)/sodium ethylenediaminetetraacetate.

The pH of the emulsion during the aftertreatment is preferably $\leq 9$.

The invention also relates to the W/O emulsions prepared by the process of the invention, especially those W/O emulsions whose residual monomer content is less than 300 ppm, preferably less than 200 ppm, based on the total W/O emulsion.

The W/O emulsion polymers preferably used in the present invention consist of a) from 35 to 100% by weight of ionic monomers, b) from 0 to 65% by weight of nonionic monomers, and c) from 0.3 to 1 mol %, based on a) and b), of at least one at least bifunctional monomer.

The reduction process of the invention is particularly suitable for reducing the amount of residual monomers in polymers comprising acrylic acid and prepared by free-radical polymerization in W/O emulsion.

The preferred end use of the W/O emulsions is in cosmetic formulations for the skin or hair.

The W/O polymer emulsion described in the present invention is prepared by inverse emulsion polymerization. In the first step, an aqueous monomer solution is emulsified in an oil phase with W/O emulsifiers typical of these systems. The polymerization is started by free-radical initiators. Since the polymers are intended to function as thickeners, they must be in chemically crosslinked form. The crosslinker is preferably added to the monomer solution.

The monomers used are preferably unsaturated $C_3$–$C_5$-carboxylic acids, such as, for example, acrylic acid, methacrylic acid, maleic acid (anhydride), fumaric acid (anhydride), itaconic acid or mixtures thereof. They can be homopolymerized or copolymerized with nonionic monomers. Suitable such monomers are unsaturated compounds which can be dissolved in water in addition to the ionic monomers; examples are acrylamide, methacrylamide, vinylpyrrolidone, vinylimidazole, vinylcaprolactam, hydroxyalkyl esters of carboxylic acids such as, for example, hydroxyethylacrylic acid. The fraction of ionic monomers in the overall monomer mixture is from 35 to 100%, preferably from 50 to 100%. Particular preference is given to an acrylic acid fraction of >90%.

The ionic monomers are neutralized to the extent of from 5 to 80%, preferably from 10 to 50%. Neutralization can in principle be carried out using all bases that can be attuned to cosmetic requirements. It is preferred to use, for example, triethanolamine, NaOH or tetrahydroxypropylethylenediamine. Mixtures of bases are also suitable.

The concentration of the monomers in the aqueous solution prior to the polymerization is from 10 to 60%.

The polymer is crosslinked by copolymerization of the monomers with at least doubly unsaturated water- or oil-soluble compounds. Suitable such compounds are methylenebisacrylamide, divinylpyrrolidone, allyl (meth)acrylate, triallylamine, ethyleneglycol diacrylates (up to 50 EO), (meth)acrylic esters with dihydric or higher polyhydric alcohols, such as trimethylolpropane triacrylate or pentaerythritol tetraacrylate; in this case the alcohol functions can carry up to 50 EO groups and can each have different degrees of ethoxylation. These crosslinkers are present in proportions of from 0.3 to 1 mol % individually or as a mixture. Water-soluble crosslinkers are preferred.

Oil components which can be used are all oils liquid at room temperature, such as, for example, fatty alcohols such as oleyl alcohol, fatty acid esters, natural oils such as sunflower oil, olive oil, avocado oil or coconut oil, wax esters such as jojoba oil, lanolin derivatives, silicone oils and aliphatic hydrocarbons having 6 or more carbon atoms, such as liquid paraffins or cyclohexane, for example.

The oil phase consists preferably of liquid paraffins or of one or more fatty acid esters. These latter components have a beneficial effect on the cosmetic formulation (appearance, sensation on the skin). Examples of such components are fatty acid isopropyl esters such as isopropyl palmitate, isopropyl myristate or polyglycerides of fatty acids, especially fatty acid mixtures containing at least 50% caprylic and/or capric acid (Miglyol 812 from Hüls). Preference is given to polyglycerol fatty acid esters based on a polyglycerol mixture containing essentially mono-, di-, tri- and tetraglycerol, especially diglycerol and triglycerol. It is of course also possible to employ mixtures of said oil components.

The fraction of the oil phase as a proportion of the total emulsion is from 15 to 70%, preferably from 20 to 35%.

In order to disperse the aqueous phase in the organic phase use is made of W/O emulsifiers known for the purpose. The HLB of the emulsifiers used is between 4 and 8 [HLB=hydrophilic/lipophilic balance, cf. W. C. Giffin, J. Soc. Cosmet. Chem. 1, 311 (1950)]. Examples of such emulsifiers are sorbitan monooleate, sorbitan monostearate, glyceryl monostearate, block copolymers of hydroxy fatty acids-polyesters and polyoxyethylene. They can be used alone or in combination in total concentrations of from 0.25 to 10%, preferably from 0.5 to 5% with respect to the total emulsions.

In addition, emulsifiers having an HLB of more than 8 can added to the emulsion in concentrations of from 0.25 to 7% with respect to the total emulsion. Examples of such emulsifiers are ethoxylated $C_6$–$C_{12}$ nonylphenols or $C_{12}$–$C_{18}$ fatty alcohols; the degree of ethoxylation is from 5 to 20 mol %.

The emulsification of the aqueous phase in the oil phase does not require any special equipment; instead, the aqueous monomer phase can be emulsified in a standard polymerization vessel by stirring using, for example, an anchor stirrer. The rotary speed is between 30 and 400 rpm depending on the geometry of the vessel.

Initiators which can be employed are water- and/or oil-soluble free-radical initiators such as, for example, alkali metal or ammonium peroxodisulfates, hydrogen peroxide, organic peroxides, with or without redox partners, and azo initiators. It is also possible to use initiators having different decomposition temperatures in unison or in succession. Based on the monomer mixture, the amount of initiator used is from 0.05 to 0.5%, preferably from 0.05 to 0.3%.

The temperature at which polymerization takes place lies between 20 and 150° C.; it can be kept constant or altered in a discontinuous manner (for example, in order to increase the degree of conversion by an increase in temperature). Following the polymerization, water-in-oil emulsions are obtained which have a solids content of from 10 to 40%, preferably from 15 to 35%. In order to raise the solids content, the emulsions can be partly or fully dewatered by distillation.

The W/O emulsions of crosslinked polymers according to the invention are used as thickeners preferably in cosmetic or pharmaceutical applications. The polymers are not used in isolation but instead directly in the form of the W/O emulsion. Typical use concentrations are from 0.1 to 0.8%, preferably from 0.2 to 0.5% of active substance (polymer). The thickening action of the W/O emulsion ensues directly following the mixing of the W/O emulsion with the cosmetic O/W emulsion; the addition of an inverter is unnecessary for achieving the optimum effect. Even purely aqueous systems can be thickened. The results is a gel cream.

The aftertreatment of the W/O emulsion polymer to reduce the residual monomer amount, in accordance with the invention, takes place in particular after at least 95 and preferably at least 98, with particular preference up to at least 99.9, % by weight of the total monomer amount has undergone reaction in the free-radical solution polymerization. The conditions during the main polymerization and during the aftertreatment are generally different. In the case of the aftertreatment, the concentration of initiating system is markedly increased relative to the main polymerization, in general, for the purpose of residual monomer depletion. Further deployment of the initiating system of the main polymerization leads to a drastic impairment of the thickener effect. Furthermore, completion, in the sense of the space-time conversion, with the initiating system from the main polymerization is ineffective and uneconomic. For the preparation of W/O emulsion polymers, therefore, different initiator systems are usually required for the main polymerization and for the aftertreatment.

As with processes of free-radical addition polymerization in general, the process of the invention also generally takes place under an inert gas (e.g. $N_2$, Ar).

It is of course possible to pass on the aftertreated W/O emulsion polymers for stripping with inert gas and/or steam.

The free-radical redox initiator systems to be used in accordance with the invention enable an effective reduction in residual monomer amount to be obtained within a relatively short time. A further point of significance is that the reducing agent claimed in accordance with the invention is, advantageously, unable to reduce the microbicides which are generally added as preservatives to W/O emulsion polymers, and so the application thereof in excess does not reduce the quality of the W/O emulsion polymer in this respect.

EXAMPLE 1

Preparation of a W/O Emulsion Polymer

A 2 l polymerization vessel equipped with anchor stirrer, thermometer, nitrogen inlet and nitrogen outlet is charged with the monomer emulsion below. The polmerisable mixture is emulsified with the initiator for 30 minutes under a stream of nitrogen. The temperature is subsequently raised to 45° C. in order to conduct polymerization. During the polymerization, the temperature rises to 70° C. Thereafter, the temperature is held at 80° C. for two hours.

| Ingredients | Amount in g |
|---|---|
| Water | 316.1 |
| Miglyol 812 [1] | 208.0 |
| Acrylic acid | 164.8 |
| 50% sodium hydroxide solution | 91.8 |
| Span 80 [2] | 8.0 |
| Arlacel P 135 [3] | 8.0 |
| Triallylamine | 18.9 |
| Wako V 59 [4] | 0.8 |
| Formic acid | 0.3 |
| Trilon C [5] | 0.15 |

1) Caprylic/capric triglyceride (Hüls AG)
2) Sorbitan monooleate
3) ABA block copolymer of a hydroxystearic acid condensate and polyethylene glycol (ICI)
4) 2,2'-azobis(2-methylbutyronitrile) (Wako)
5) Pentasodium diethylenetriaminepentaacetate The acrylic acid content of the W/O emulsion polymer was determined by HPLC following precipitation of the polymer in the supernatant solution with barium sulfate.

The thickening action was evaluated on the basis of a gel cream formulation in which 0.5% by weight of active substance in the form of a W/O emulsion was homogenized in water with the addition of 1% Cremophor A 25 as inverter. The viscosity of the gel cream prepared in this way was determined using a Haake manual viscometer.

The W/O emulsion polymer prepared above had an acrylic acid content of 570 ppm based on the W/O emulsion. The gel cream prepared using the W/O emulsion polymer had a viscosity of 21 Pa*s.

EXAMPLE 2

Preparation of a W/O Emulsion Polymer

In the same way as in Example 1, a W/O emulsion polymer was prepared from the following ingredients.

| Ingredients | Amount in g |
|---|---|
| Water | 316.1 |
| Liquid paraffin | 208.0 |
| Acrylic acid | 164.8 |
| 50% sodium hydroxide solution | 91.8 |
| Span 80 [2] | 8.0 |
| Arlacel P 135 [3] | 8.0 |
| Triallylamine | 18.9 |
| Wako V 59 [4] | 0.8 |
| Formic acid | 0.3 |
| Trilon C [5] | 0.15 |

The W/O emulsion polymer had an acrylic acid content of 750 ppm based on the W/O emulsion. The gel cream prepared using the W/O emulsion polymer had a viscosity of 27 Pa*s.

EXAMPLES 3 to 11

Feed stream 1 (Table 1) was added in each case to 100 g of the W/O emulsion polymer from Example 1 in order to reduce the residual monomer amount. Subsequently, at the stated temperature, feed stream 2 was metered in over the feed period indicated.

The acrylic acid content of the aftertreated polymers and the viscosities of the gel creams prepared using the polymers were determined.

TABLE 1

| Example | Feed stream 1 | | Feed stream 2 | Feed time in h | T in °C. | Acrylic acid content based on W/O emulsion | Viscosity of the gel cream in Pa*s |
|---|---|---|---|---|---|---|---|
| 3 | $H_2O_2$ 1.17 g[a] | Iron sulfate 0.1 g[b] | Tartaric acid 0.43 g[c] | 2 | 40 | 260 ppm | 23 |
| 4 | $H_2O_2$ 1.17 g[a] | Iron sulfate 0.1 g[b] | Tartaric acid 0.43 g[c] | 4 | 40 | 150 ppm | 23 |
| 5 | $H_2O_2$ 1.17 g[a] | Iron sulfate 0.1 g[b] | Tartaric acid 0.43 g[c] | 2 | 70 | 75 ppm | 21 |
| 6 | $H_2O_2$ 1.17 g[a] | Iron sulfate 0.1 g[b] | Tartaric acid 0.43 g[c] | 4 | 70 | 110 ppm | 22 |
| 7 | $H_2O_2$ 1.17 g[a] | Iron sulfate 0.1 g[b] | Tartaric acid 0.22 g[c] | 4 | 70 | 150 ppm | 23 |
| 8 | $H_2O_2$ 2.34 g[a] | Iron sulfate 0.1 g[b] | Tartaric acid 0.43 g[c] | 4 | 70 | 110 ppm | 22 |
| 9 | t-BuOOH[d] 1.19 g | Iron sulfate 0.1 g[b] | Tartaric acid 0.21 g[c] | 2 | 70 | 150 ppm | 21 |
| 10 | $H_2O_2$ 1.17 g[a] | Iron sulfate 0.1 g[b] | α-Hydroxy-acetone 1.77 g[e] | 4 | 70 | 120 ppm | 23 |
| 11 | $H_2O_2$ 1.17 g[a] | Iron sulfate 0.1 g[b] | α,α-Di-hydroxy-acetone 2.11 g[e] | 4 | 70 | 100 ppm | 22 |
| 12 | Tartaric acid 0.43 g[c] | Iron sulfate 0.1 g[b] | $H_2O_2$ 1.17 g[a] | 2 | 70 | 220 ppm | 24 |

TABLE 1-continued

| Example | Feed stream 1 | | Feed stream 2 | Feed time in h | T in °C. | Acrylic acid content based on W/O emulsion | Viscosity of the gel cream in Pa*s |
|---|---|---|---|---|---|---|---|
| 13 | H$_2$O$_2$ 2.34 g$^{a)}$ | Iron sulfate 0.1 g$^{b)}$ | Tartaric acid 0.21 g$^{c)}$ | 2 | 70 | 220 ppm | 24 |

$^{a)}$3% strength aqueous solution
$^{b)}$1% strength aqueous solution
$^{c)}$10% strength aqueous solution
$^{d)}$tert-butyl hydroperoxide 10% strength aqueous solution
$^{e)}$5% strength aqueous solution EXAMPLES 14 to 15

Feed stream 1 from Table 2 was added in each case to 100 g of the W/O emulsion polymer from Example 2 in order to reduce the residual monomer amount. Subsequently, at the stated temperature, feed stream 2 was metered in over the feed period indicated.

The acrylic acid content of the aftertreated polymers and the viscosities of the gel creams prepared using the polymers were determined.

TABLE 2

| Example | Feed stream 1 | | Feed stream 2 | Feed time in h | T in °C. | Acrylic acid content based on W/O emulsion | Viscosity of the gel cream in Pa*s |
|---|---|---|---|---|---|---|---|
| 14 | H$_2$O$_2$ 1.17 g$^{a)}$ | Iron sulfate 0.1 g$^{b)}$ | Tartaric acid 0.43 g$^{c)}$ | 2 | 70 | 260 ppm | 28 |
| 15 | H$_2$O$_2$ 1.17 g$^{a)}$ | Iron sulfate 0.1 g$^{b)}$ | Tartaric acid 0.43 g$^{c)}$ | 4 | 70 | 250 ppm | 27 |

We claim:

1. A process for reducing the residual monomer content in a W/O emulsion comprising crosslinked water-swollen addition polymers dispersed therein, said process comprising aftertreating said W/O emulsion with a redox initiator system comprising,
   a) from 0.001 to 5% by weight, based on the total monomer amount used to prepare the polymer,
      a1) of an oxidizing agent:
         R$^1$OOH,
         where R$^1$ is hydrogen, a C$_1$- to C$_8$-alkyl or C$_6$- to C$_{12}$ aryl group, and/or
      a2) of a compound which in aqueous medium releases hydrogen peroxide, and
   b) from 0.005 to 5% by weight, based on the total monomer amount used to prepare the polymer of a reducing agent,
      b1) which is an α-hydroxy carbonyl compound:

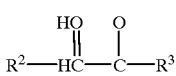

where, independently of each other,
R$^2$ is hydrogen or a C$_1$–C$_{12}$-alkyl group which optionally contains functional groups and/or can be olefinically unsaturated,
R$^3$ is hydrogen, OH, a C$_1$–C$_{12}$-alkyl group which optionally contains functional groups and/or can be olefinically unsaturated,
and R$^2$ and R$^3$ can form a ring structure which can include a heteroatom and/or functional groups and/or can be olefinically unsaturated, and/or
      b2) a compound which in aqueous medium releases an α-hydroxy carbonyl compound, and
   c) catalytic amounts of a polyvalent metal ion which is able to exist in a plurality of valence states.

2. A process as claimed in claim 1, wherein said oxidizing agent is an inorganic compound.

3. A process as claimed in claim 1, wherein said oxidizing agent is hydrogen peroxide.

4. A process as claimed in claim 1, wherein R$^2$ is a hydroxycarboxymethyl group.

5. A process as claimed in claim 1, wherein the polyvalent metal ions are added to said W/O emulsion polymer in said aftertreatment prior to said oxidising agent and said reducing agent.

6. A process as claimed in claim 1, wherein said polyvalent metal ion comprises iron ions.

7. A process as claimed in claim 1, wherein the temperature of said W/O emulsion during said aftertreatment is from 30 to 130° C.

8. A process as claimed in claim 1, wherein said aftertreatment is conducted under superatmospheric pressure, at atmospheric pressured (1 bar absolute), or under subatmospheric pressure.

9. A process as claimed in claim 1, wherein the pH of said emulsion during said aftertreatment is ≦9.

10. The process of claim 1, wherein the polyvalent metal ion consists of iron.

11. A process as claimed in claim 1, wherein said polymers consist of
   a) from 35 to 100% by weight of ionic monomers,
   b) from 0 to 65% by weight of nonionic monomers, and
   c) from 0.3 to 1 mol %, based on a) and b), of at least one at least bifunctional monomer.

12. A process as claimed in claim 11, wherein said ionic monomers are unsaturated C$_3$–C$_5$ carboxylic acids.

13. A process as claimed in claim 11, wherein said ionic monomers are neutralized to the extent of from 5 to 80%.

14. A process as claimed in claim 11, wherein said oxidizing agent a) is introduced initially and said reducing agent b) is introduced during the aftertreatment.

15. A process as claimed in claim 1, wherein the oil phase consists of one or more fatty acid esters.

16. A process as claimed in claim 15, wherein said oil phase consists of a triglyceride.

17. A process as claimed in claim 1, wherein said W/O emulsion contains from 0.25 to 10% by weight of an emulsifier.

18. The process of claim 17, wherein the W/O emulsion contains from 0.5 to 5% by weight of an emulsifier.

19. A W/O emulsion prepared by a process as claimed in claim 1.

20. A W/O emulsion as claimed in claim 19, having a residual monomer content of less than 300 ppm, based on the W/O emulsion.

* * * * *